US012437745B2

(12) United States Patent
Laroche et al.

(10) Patent No.: US 12,437,745 B2
(45) Date of Patent: Oct. 7, 2025

(54) WEARABLE ELECTRONIC DEVICE FOR EMITTING A MASKING SIGNAL

(71) Applicant: GN AUDIO A/S, Ballerup (DK)

(72) Inventors: Clément Laroche, Ballerup (DK); Rasmus Kongsgaard Olsson, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 798 days.

(21) Appl. No.: 17/038,953

(22) Filed: Sep. 30, 2020

(65) Prior Publication Data

US 2021/0104222 A1 Apr. 8, 2021

(30) Foreign Application Priority Data

Oct. 4, 2019 (EP) .................................... 19201470

(51) Int. Cl.
*G10L 25/00* (2013.01)
*G10L 13/027* (2013.01)
*G10L 25/78* (2013.01)

(52) U.S. Cl.
CPC ............ *G10L 13/027* (2013.01); *G10L 25/78* (2013.01); *G10L 2025/786* (2013.01)

(58) Field of Classification Search
CPC ....... G10L 13/027; G10L 25/78; G10L 25/84; G10L 2025/783; G10L 2025/786; G10L 17/00; G10L 15/00; G10L 15/222; G10L 2015/2221; G10L 15/22; G10L 2015/223; G10L 19/028; G10L 21/0272;
(Continued)

(56) References Cited

U.S. PATENT DOCUMENTS

| | | | |
|---|---|---|---|
| 8,964,997 | B2 | 2/2015 | Gauger, Jr. |
| 9,270,442 | B2 | 2/2016 | Usher et al. |

(Continued)

FOREIGN PATENT DOCUMENTS

| | | | |
|---|---|---|---|
| CN | 104394491 B | 1/2018 | |
| WO | 2015148658 A1 | 10/2015 | |

OTHER PUBLICATIONS

The extended European search report issued in European Application No. 19201470.2, dated Mar. 5, 2020.

(Continued)

*Primary Examiner* — Edgar X Guerra-Erazo
(74) *Attorney, Agent, or Firm* — HSML P. C.

(57) ABSTRACT

A signal processing method and a wearable electronic device such as a headphone or an earphone comprising a microphone arranged to pick up an acoustic signal and convert the acoustic signal to a microphone signal (x); a loudspeaker arranged in an earpiece; and a processor configured to control the volume of a masking signal (m); and supply the masking signal (m) to the loudspeaker. Further, the processor is further configured to detect voice activity and generate a voice activity signal (y) which is, concurrently with the microphone signal, sequentially indicative of one or more of: voice activity and voice in-activity; and control the volume of the masking signal (m) in response to the voice activity signal (y) in accordance with supplying the masking signal (m) to the loudspeaker at a first volume at times when the voice activity signal (y) is indicative of voice activity and at a second volume at times when the voice activity signal (y) is indicative of voice in-activity.

15 Claims, 4 Drawing Sheets

(58) Field of Classification Search
CPC ... G10L 25/30; G10L 25/60; G10L 2015/225; G10L 21/0208; G10L 25/87; G10L 2025/935; G10L 2025/937; G10L 21/0232; G10L 21/028; G10L 21/02; H04R 1/1084; H04R 25/70; H04R 2225/43; H04R 25/407; H04R 25/554; H04R 2460/01; H04R 25/505; H04R 25/558; H04R 1/1083; H04R 3/005; H04R 25/604; G10K 11/00; G10K 11/16; G10K 11/175; G10K 11/1752; G10K 11/1754; G10K 11/178; G10K 11/1781; G10K 11/17821; G10K 11/17823; G10K 11/17827; G10K 11/1783; G10K 11/17837; G10K 11/1785; G10K 11/17881; G10K 11/17885; G06F 3/167
See application file for complete search history.

(56) References Cited

U.S. PATENT DOCUMENTS

2011/0182438 A1* 7/2011 Koike ...................... H04K 3/45 381/73.1
2011/0235813 A1* 9/2011 Gauger, Jr. ............. G10L 21/02 381/74
2011/0251845 A1* 10/2011 Arakawa ................. G10L 25/78 704/E21.001
2014/0257802 A1 9/2014 Asada et al.
2015/0194144 A1* 7/2015 Park ......................... H04K 3/41 381/73.1
2015/0348530 A1 12/2015 Findlay et al.
2017/0352342 A1 12/2017 Lee
2019/0088243 A1* 3/2019 Prasad ............... G10K 11/1754
2019/0306608 A1 10/2019 Yeo
2020/0074997 A1* 3/2020 Jankowski, Jr ........ G06N 3/045
2020/0219530 A1* 7/2020 Nesta ....................... G06N 3/08
2020/0329297 A1* 10/2020 Dutt ................... G10K 11/1752

OTHER PUBLICATIONS

Patentability Search Report—2019Q00002, Machine Learning-Based Music Masker, dated Apr. 24, 2019, 40 pages provided.
Rob Verger, "The 'Artificial Intelligence' in Your New Smart Gadget May Not Be What You Think", Published Jan. 12, 2019, cited in the Patentability Search Report, 3 pages provided.
Stevens et al., "A scale for the measurement of the psychological magnitude pitch", Journal of the Acoustical Society of America. 8 (3): 185-190, Jan. 1937.
Intention to grant issued in European Application No. 20 198 989.4, mailed Aug. 16, 2024.

* cited by examiner

WEARABLE ELECTRONIC DEVICE FOR EMITTING A MASKING SIGNAL

Wearable electronic devices such as headphones or earphones comprise a pair of small loudspeakers sitting in earpieces worn by a wearer (a user of the wearable electronic device) in different ways depending on the configuration of the headphones or earphones. Earphones are usually placed at least partially in the wearer's ear canals and headphones are usually worn by a headband or neckband with the earpieces resting on or over the wearer's ears. Headphones or earphones let a wearer listen to an audio source privately, in contrast to a conventional loudspeaker, which emits sound into the open air for anyone nearby to hear. Headphones or earphones may connect to an audio source for playback of audio. Also, headphones are used to establish a private quiet space e.g. by one or both of passive and active noise reduction to reduce a wearer's strain and fatigue from sounds in the surrounding environment. In an open plan office environment, where other people have conversations, such as loud conversations, wearable electronic devices such as headphones may be used to obtain a quiet working environment. However, it has been found that both passive and active noise reduction may not be sufficient to reduce the distractive character of human speech in the surrounding environment. Such distraction is most commonly caused by the conversation of nearby people though other sounds also can distract the user, for example while the user is performing a cognitive task.

In particular, this may be a problem with active noise reduction which is good at reducing noise with tones or low frequent noise, such as noise from machines, but is less good at reducing noise from voice activity. Active noise reduction relies on capturing a microphone signal e.g. in a feedback, feedforward or a hybrid approach and emitting a signal via the loudspeaker to counter an ambient acoustic (noise) signal from the surroundings.

In contrast, conventionally in the context of telecommunication, a headset enables communication with a remote party e.g. via a telephone, which may be a so-called softphone or another type of application running on an electronic device. A headset may use wireless communication e.g. in accordance with a Bluetooth or DECT compliant standard. However, headsets rely on capturing the wearer's own speech in order to transmit a voice signal to a far-end party.

RELATED PRIOR ART

Headphones or earphones with active noise reduction or active noise cancellation, sometimes abbreviated ANC or ANR, help with providing a quieter private working environment for the wearer, but such devices are limited since they do not reduce speech from people in the vicinity to an inaudible, unintelligible level. Thus, some level of distraction remains.

Playing instrumental music to a person has proven to somewhat reduce distractions caused by speech from people in the vicinity of the person. However, listening to music at a fixed volume level, in an attempt to mask distracting voice activity, may not be ideal if the intensity of the distracting voices is varying during the course of a day. A high level of instrumental music may mask all the distracting voice, but listening to music at this level for an extended period might cause listening fatigue. On the other hand, a soft level of music may not mask the distracting voice sufficiently to not be distracted by it.

U.S. Pat. No. 8,964,997 (assigned on its face to Bose Corp.) discloses a masking module that automatically adjusts the audio level to reduce or eliminate distraction or other interference to the user from the residual ambient noise in the earpiece. The masking module masks ambient noise by an audio signal that is being presented through headphones. The masking module performs gain control and/or level compression based on the noise level so the ambient noise is less easily perceived by the user. In particular, the masking module adjusts the level of the masking signal so that it is only as loud as needed to mask the residual noise. Values for the masking signal are determined experimentally to provide sufficient masking of distracting speech. Thus, the masking module uses a masking signal to provide additional isolation over the active or passive attenuation provided by the headphones US 2015/0348530 (assigned on its face to Plantronics) discloses a system a system for masking distracting sounds in a headset. The noise-masking signal essentially replaces a meaningful, but unwanted, sound (e.g., human speech) with a useless, and hence less distracting, noise known as 'comfort noise'. A digital signal processor automatically fades the noise-masking signal back down to silence when the ambient noise abates (e.g., when the distracting sound ends). The digital signal processor uses dynamic or adaptive noise masking such that, as the distracting sound increases (e.g., a speaking person moves closer to a headset, the digital signal processor increases the noise-masking signal, following the amplitude and frequency response of the distracting sound. It is emphasized that embodiments aim to reduce ambient speech intelligibility while having no detrimental impact on headset audio speech intelligibility.

However, it remains a problem that the headphone wearer may experience an unpleasant listening fatigue due to the masking signal being emitted by the loudspeaker at any time when a distracting sound is detected.

SUMMARY

Hence, there is a need for a wearable device which masks distracting noise but at the same time minimizes listening fatigue. There is provided:

A wearable electronic device comprising:

an electro-acoustic input transducer arranged to pick up an acoustic signal and convert the acoustic signal to a microphone signal;

a loudspeaker; and a processor configured to:

control the volume of a masking signal; and supply the masking signal to the loudspeaker;

CHARACTERIZED in that the processor is further configured to:

based on processing at least the microphone signal, detect voice activity and generate a voice activity signal which is, concurrently with the microphone signal, sequentially indicative of one or more of: voice activity and voice in-activity; and control the volume of the masking signal in response to the voice activity signal in accordance with supplying the masking signal to the loudspeaker at a first volume at times when the voice activity signal is indicative of voice activity and at a second volume at times when the voice activity signal is indicative of voice inactivity.

In some aspects, the first volume is larger than the second volume. In some aspects, the first volume is at a level above the second volume at all times. In some aspects, the masking signal is supplied to the loudspeaker currently with presence of voice activity based on the voice activity signal. The masking signal serves the purpose of actively masking speech signals that may leak in to the wearer's one or both ears despite of some passive dampening caused by the wearable device. The passive dampening may be caused by the wearable electronic device occupying the wearer's ear canals or arranged on or around the wearer's ears. The active masking is effectuated by controlling the volume of the masking signal in response to the voice activity signal. The volume of the masking signal is louder at times when voice activity is detected than at times when voice inactivity is detected.

Thereby a masking effect, disturbing the intelligibility of speech, is enhanced or engaged by supplying the masking signal to the loudspeaker (at the first volume) at times when the voice activity signal is indicative of voice activity. At times, when the voice activity signal is indicative of voice inactivity, the volume of the masking signal is reduced (at the second volume) or disengaged (corresponding to a second volume which is infinitely lower than the first volume). The volume of the masking signal is thus reduced, at times when the voice activity signal is indicative of voice inactivity, since masking of voice activity is not needed to serve the purpose of reducing intelligibility of speech in vicinity of the wearer.

In some examples, the second volume corresponds to forgoing supplying the masking signal to the loudspeaker or supplying the masking signal at a level considered barely audible to a user with normal hearing. In some examples the second volume is significantly lower than the first volume e.g. 12-50 dB-A lower than the first volume.

Thereby, during the course of a day or shorter periods of use, the user is exposed to the masking signal, only at times when the masking signal serves the purpose of reducing intelligibility of acoustic speech reaching the headphone wearer's ear. This, in turn, reduces listening fatigue induced by the masking signal being emitted by the loudspeaker during the course of a day or shorter periods of use. The wearer is thus exposed to lesser acoustic strain.

Thus, the wearable device may react to ambient voice activity by emitting the masking signal to mask, at a sufficient first volume, the ambient voice activity, but other sounds in the work environment such as keypresses on a keyboard are not masked at all or at least only at a lower, second volume. It is thereby utilized that other sounds than speech related sounds, tends to distract a person less than audible speech.

The wearable electronic device may emit the masking signal towards the wearer's ears when people are speaking in proximity of the wearer e.g. within a range up to 8 to 12 meters. The range depends on a threshold sound pressure at which voice activity is detected. Such a threshold sound pressure may be stored or implemented by the processor. The range also depends on how loud the voice activity is, that is, how loud one or more persons is/are speaking.

In some aspects, the volume of the masking signal is adjusted, at times when the voice activity signal is indicative of voice activity, in accordance with a sound pressure level of the acoustic signal picked up by the electro-acoustic input transducer at times when the voice activity signal is indicative of voice activity.

In some examples, the volume of the masking signal is adjusted, at times when the voice activity signal is indicative of voice activity, based on a sound pressure level of the acoustic signal picked up by the electro-acoustic input transducer at times when the voice activity signal is indicative of voice activity. For instance, the volume of the masking signal is adjusted proportionally to the sound pressure level of the acoustic signal picked up by the electro-acoustic input transducer at times when the voice activity signal is indicative of voice activity. In some examples, the volume of the masking signal is adjusted proportionally, e.g. substantially linearly or stepwise, to the sound pressure level of the acoustic signal at least at times when the sound pressure level is below a predefined upper threshold and/or above a predefined lower threshold. In some aspects, the masking signal is a two-level signal being controlled to have either the first volume or the second volume. In some aspects, the masking signal is a three-level signal being controlled to have the first volume or the second volume or a third volume. The first volume may be a fixed first volume. The second volume may be a fixed second volume, e.g. corresponding to be 'off', not being supplied to the loudspeaker. The third volume may be higher or lower than the first volume or the second volume. In some aspects, the masking signal is a multi-level signal with more than three volume levels.

In some aspects, the volume of the masking signal is controlled adaptively in response to a sound pressure level of the acoustic signal e.g. at times when the voice activity signal is indicative of voice activity. In some aspects, the processor or method forgoes controlling the volume of the masking signal adaptively at times when the voice activity signal is indicative of voice inactivity.

In some aspects, the processor, concurrently:

- supplies the masking signal to the loudspeaker and/or controls the volume of the masking signal in response to the voice activity signal; and
- forgoes signal processing enabling pass-through of sounds captured by a microphone at the wearable device to a loudspeaker of the wearable electronic device.

In some aspects, the processor, concurrently:

- supplies the masking signal to the loudspeaker and/or controls the volume of the masking signal in response to the voice activity signal; and
- forgoes signal processing enabling hear-through of sounds captured by a microphone at the wearable device to a loudspeaker of the wearable electronic device; and
- performs active noise cancellation.

The wearable electronic device may forgo emitting the masking signal towards the wearer's ears at times when speak is not detected, but noise from e.g. pressing a keyboard may be present. This may be the case in an open plan office environment. The wearable electronic device may be configured e.g. as a headphone or a pair of earphones and may be used by a wearer of the device to obtain a quiet working environment wherein detected acoustic speech signals reaching the wearer's ears are masked.

The processor may be implemented as it is known in the art and may comprise a so-called voice activity detector (typically abbreviated a VAD), also known as a speech activity detector or speech detector. The voice activity detector is capable of distinguishing periods of voice activity from periods of voice in-activity. Voice activity may be considered a state wherein presence of human speech is detectable by the processor. Voice in-activity may be considered a state wherein presence of human speech is not detectable by the processor. The processor may perform one or both of time-domain processing and frequency-domain processing to generate the voice activity signal.

The voice activity signal may be binary signal wherein voice activity and voice in-activity are represented by respective binary values. The voice activity signal may be a multilevel voice activity signal representing e.g. one or both of: a likelihood that speech activity is occurring, and the level, e.g. loudness, of the detected voice activity. The volume of the masking signal may be controlled gradually, over more than two levels, in response to a multilevel voice activity signal. In some aspects the processor is configured to control the volume of the masking signal adaptively in response to the microphone signal. In some aspects the volume of the masking signal is set in accordance with an estimated required masking volume. The volume of the masking signal may e.g. be set equal to the estimated required masking volume or be set in accordance with another predetermined relation. The estimated required masking volume may be a function of one or both of: an estimated volume of speech activity and an estimated volume of other activities than speech activity. The estimated required masking volume may be proportional to an estimated volume of speech activity. The estimated required masking volume may be obtained from experimentation e.g. involving listening tests to determine a volume of the masking signal, which is sufficient to reduce distractions from speech activity at least to a desired level. The estimated volume of speech activity and/or the estimated volume of other activities than speech activity may be determined based on processing the microphone signal. In some aspects the processing may comprise processing a beamformed signal obtained by processing multiple microphone signals from respective multiple microphones.

The voice activity signal is concurrent with microphone signal albeit signal processing to detect voice activity takes some time to perform, so the voice activity signal will suffer from a delay with respect to detecting voice activity in the microphone signal. In an example, the voice activity signal is input to a smoothing filter to limit the number of false positives of voice activity. In one example, the signals are processed frame-by-frame and voice activity is indicated as a value, e.g. a binary value or a multi-level value, per frame. In one example, detection of voice activity is determined only if a predefined number of frames is determined to voice activity. In some examples, the predefined number of frames is at least 4 or 5 consecutive frames. Each frame may have a duration of about 30-40 milliseconds, e.g. 33 milliseconds. Consecutive frames may have a temporal overlap of 40-60% e.g. 50%. This means that speech activity can be reliably detected within about 100 milliseconds or within a shorter or longer period.

Generally, the wearable device may be configured as:

- a headphone to be worn on a wearer's head e.g. by means of a headband or to be worn around the wearer's neck e.g. by means of a neckband;
- a pair of earphones to be worn in the wearer's ears;
- a headphone or a pair of earphones including one or more microphones and a transceiver to enable a headset mode of the headphones or the pair of earphones.

Generally, headphones comprise earcups to sit over or on the wearer's ears and earphones comprise earbuds or earplugs to be inserted in the wearer's ears. Herein, earcups, earbuds or earplugs are designated earpieces. The earpieces are generally configured to establish a space between the eardrum and the loudspeaker. The microphone may be arranged in the earpiece, as an inside microphone, to capture sound waves inside the space between the eardrum and the loudspeaker or in the earpiece, as an outside microphone, to capture sound waves impinging on the earpiece from the surroundings.

In some aspects the microphone signal comprises a first signal from an inside microphone. In some embodiments the microphone signal comprises a second signal from an outside microphone. In some embodiments the microphone signal comprises the first signal and the second signal. The microphone signal may comprise one or both of the first signal and the second signal from a left side and from a right side.

In some aspects the processor is integrated in the body parts of the wearable device. The body parts may include one or more of: an earpiece, a headband, a neckband and other body parts of the wearable device. The processor may be configured as one or more components e.g. with a first component in a left side body part and a second component in a right side body part of the wearable device.

In some aspects the masking signal is received via a wireless or a wired connection to an electronic device e.g. a smartphone or a personal computer. The masking signal may be supplied by an application, e.g. an application comprising an audio player, running on the electronic device.

In some aspects the microphone is a non-directional microphone, such as an omnidirectional microphone e.g. with a cardioid, super cardioid, or figure-8 characteristic.

In some embodiments, the processor is configured with one or both of:

- an audio player to generate the masking signal by playing an audio track; and
- an audio synthesizer to generate the masking signal using one or more signal generators.

Thus, the processor, integrated in the wearable device, may be configured with a player to generate the masking signal by playing an audio track. The audio track may be stored in a memory of the processor. An advantage thereof is that the wearable device may be fully functional to emit the masking signal without requiring a wired or wireless connection to an electronic device. This may in turn reduce power consumption, which is an advantage in connection with e.g. battery operated electronic devices.

In some aspects, the audio track is uploaded from an electronic device as mentioned above to the memory of the wearable device. In some aspects, the masking signal may be generated by the processor in accordance with an audio stream or audio track received at the processor via a wireless transceiver at the wearable device. The audio stream or audio track may be transmitted by a media player at an electronic device such as a smartphone, a tablet computer, a personal computer or a server computer. The volume of the masking signal is controlled as set out above.

The audio track may comprise audio samples e.g. in accordance with a predefined codec. In some aspects the audio track contains a combination of music, natural sounds or artificial sounds resembling one or more of music and natural sounds. The audio track may be selected, e.g. among a predefined set of audio tracks suitable for masking, via an application running on an electronic device. This allows the wearer a greater variety in the masking or the option to select or deselect certain tracks.

In some aspects the player plays the audio track or a sequence of multiple audio tracks in an infinite loop.

In some aspects the player is enabled to play back the track or the sequence of multiple audio tracks continuously at times when a first criterion is met. The first criterion may be that wearable device is in a first mode. In the first mode the wearable device may be configured to operate as a headphone or an earphone. The first criterion may additionally or alternatively comprise that the voice activity signal is indicative of voice activity. Thus, in accordance with the first criterion comprising that the voice activity signal is indicative of voice activity, the player may resume playback in response to the voice activity signal transitioning from being indicative of voice activity not detected to being indicative of voice activity.

In some aspects the synthesizer generates the masking by one or more noise generators generating coloured noise and by one or more modulators modifying the envelope of a signal from a noise generator. In some aspects the synthesizer generates the masking signal in accordance with stored instructions e.g. MIDI instructions. An advantage thereof is that variation in the masking signal may be obtained by changing one or more parameters rather than a sequence of samples, which may reduce memory consumption while still offering flexibility.

In some embodiments the processor is configured to include a machine learning component to generate the voice activity signal (y); wherein the machine learning component is configured to indicate periods of time in which the microphone signal comprises:

- signal components representing voice activity, or
- signal components representing voice activity and signal components representing noise, which is different from voice activity.

Thereby the machine learning component may be configured to implement effective detection of voice activity and effective distinguishing between voice activity and voice in-activity.

The voice activity signal may be in the form of a time-domain signal or a frequency-time domain signal e.g. represented by values arranged in frames.

The time-domain signal may be a two-level or multi-level signal.

The machine learning component is configured by a set of values encoded in one or both of hardware and software to indicate the periods of time. The set of values are obtained by a training process using training data. The training data may comprise input data recorded in a physical environment or synthesized e.g. based on mixing non-voice sounds and voice sounds. The training data may comprise output data representing presence or absence, in the input data, of voice activity. The output data may be generated by an audio professional listening to examples of microphone signals. Alternatively, in case the input data are synthesized, the output data may be generated by the audio professional or be obtained from metadata or parameters used for synthesizing the input data. The training data may be constructed or collected to include training data being, at least predominantly, representative of sounds, e.g. from selected sources of sound, from a predetermined acoustic environment such as an office environment.

Examples of noise, which is different from voice activity, may be sounds from pressing the keys of a keyboard, sounds from an air condition system, sounds from vehicles etc. Examples of voice activity may be sounds from one or more person speaking or shouting.

In some aspects, the machine learning component is characterized by indicating the likelihood of the microphone containing voice activity in a period of time.

In some aspects, the machine learning component is characterized by indicating the likelihood of the microphone signal containing voice activity and signal components representing noise, which is different from voice activity in a period of time. The signal components representing noise, which is different from voice activity may be e.g. noise from keyboard presses.

The likelihood may be represented in a discrete form e.g. in a binary form.

The machine learning component represents correlations between:

- voice activity signals with and without noise signals and a value representing presence of voice activity; and
- voice in-activity signals with and without noise signals and a value representing absence of voice activity;

Such correlations are recognized in the art. The microphone signal may comprise the voice activity signal and the voice in-activity signal.

In some aspects the microphone signal is in the form of a frequency-time representation of audio waveforms in the time-domain. In some aspects the microphone signal is in the form of an audio waveform representation in the time-domain.

In some aspects the machine learning component is a recurrent neural network receiving samples of the microphone signal within a predefined window of samples and outputting the voice activity signal. In some aspects the machine learning component is a neural network such as a deep neural network.

In some embodiments the machine learning component detects the voice activity based on processing time-domain waveforms of the microphone signal.

The machine learning component may be more effective at detecting voice activity based on processing time-domain waveforms of the microphone signal. This is particularly useful when frequency-domain processing of the microphone signal is not needed for other purposes in the processor.

In some aspects the recurrent neural network has multiple input nodes receiving a sequence of samples of the microphone signal and at least one output node outputting the voice activity signal. The input nodes may receive the most recent samples of the microphone signal. For instance the input nodes may receive the most recent samples of the microphone signal corresponding to a window of about 10 to 100 milliseconds duration e.g. 30 milliseconds. The window may have a shorter or longer duration.

As mentioned above, in some aspects the machine learning component is a neural network such as a deep neural network. In some aspects the machine learning component is a recurrent neural network and detects the voice activity based on processing time-domain waveforms of the microphone signal. A recurrent neural network may be more effective at detecting voice activity based on processing time-domain waveforms of the microphone signal.

In some embodiments the processor is configured to:

concurrently with reception of the microphone signal:

- generate frames comprising a frequency-time representation of waveforms of the microphone signal; wherein the frames comprise values arranged in frequency bins;
- comprise a machine learning component configured to detect the voice activity based on processing the frames including the frequency-time representation of waveforms of the microphone signal.

The machine learning component may be more effective at detecting voice activity based on processing the frames comprising a frequency-time representation of waveforms of the microphone signal when the voice activity is present concurrently with other noise activity signals.

In some aspects the neural network is a recurrent neural network with multiple input nodes and at least one output node; wherein the processor is configured to 1) input a sequence of all or a portion of the values in a selected frequency bin to the input nodes of the recurrent neural network;

2) output, at the at least one output node, a respective voice activity signal for the selected frequency bin; and$_{[BL1]}$ 3) perform 1) and 2) above concurrently and/or in a sequence for all or selected frequency bins of a frame.

In some embodiments the neural network is a convolutional neural network with multiple input nodes and multiple output nodes. The multiple input nodes may receive the values of a frame and output values of a frame in accordance with a frequency-time representation. In some aspects, the multiple input nodes may receive the values of a frame and output values in accordance with a time-domain representation.

The frames may be generated from overlapping sequences of samples of the microphone signals. The frames may be generated from about 30 milliseconds of samples e.g. comprising 512 samples. The frames may overlap each other by about 50%. The frames may comprise 257 frequency bins. The frames may be generated from longer or shorter sequences of samples. Also, the sampling rate may be faster or slower. The overlap may be larger or smaller.

The frequency-time representation may be in accordance with the MEL scale as described in: Stevens, Stanley Smith; Volkmann; John & Newman, Edwin B. (1937). "A scale for the measurement of the psychological magnitude pitch". Journal of the Acoustical Society of America. 8 (3): 185-190. Alternatively, the frequency-time representation may be in accordance with approximations thereof or in accordance with other scales having a logarithmic or approximate logarithmic relation to the frequency scale.

The processor may be configured to generate the frames comprising a frequency-time representation of waveforms of the microphone signal by one or more of: a short-time Fourier transform, a wavelet transform, a bilinear time-frequency distribution function (Wigner distribution function), a modified Wigner distribution function, a Gabor-Wigner distribution function, Hilbert-Huang transform, or other transformations.

In some embodiments the machine learning component is configured to generate the voice activity signal in accordance with a frequency-time representation comprising values arranged in frequency bins in a frame; wherein the processor controls the masking signal in accordance with a time and frequency distribution of the envelope of the masking signal substantially matching the voice activity signal or the envelope of the voice activity signal, which is in accordance with the frequency-time representation.

Thereby the masking signal matches the voice activity e.g. with respect to energy or power. This enables more accurately masking the voice activity, which in turn may lessen listening strain perceived by a wearer of the wearable device. The masking signal is different from a detected voice signal in the microphone signal. The masking signal is generated to mask the voice signal rather than to cancel the voice signal.

In some aspects the processor is configured to generate the masking signal by mixing multiple intermediate masking signals; wherein the processor controls one or both of the mixing and content of the intermediate masking signals to have a time and frequency distribution matching the voice activity signal, which is in accordance with the frequency-time representation. The processor may also synthesize the masking signal as described above to have the time and frequency distribution matching the voice activity signal.

Thus, the masking signal may be composed to match the energy level of the microphone signal in segments of bins which are determined to contain voice activity. In segments of bins which are determined to contain voice in-activity, the masking signal is composed to not match the energy level of the microphone signal.

In some embodiments the processor is configured to:

gradually increase the volume of the masking signal over time in response to detecting an increasing frequency or density of voice activity.

Thereby a good trade-off between early masking, when voice activity commences, and reduction of audible artefacts due to the masking signal may be achieved.

In some aspects, the processor is configured to gradually decrease the volume of the masking signal over time in response to detecting a decreasing frequency or density of voice activity. Thereby, masking signal is faded rather than being switched off or abruptly. In particular, the risk the risk of introducing audible artefacts, which may be unpleasant to the wearer of the device, is reduced.

In some embodiments the processor is configured with:

a mixer to generate the masking signal from one or more selected intermediate masking signals from multiple intermediate masking signals; wherein selection of the one or more selected intermediate masking signals is performed in accordance with a criterion based on one or both of: the microphone signal and the voice activity signal.

Thereby the masking signal can be configured from a variety of possible combinations. In some aspects the mixer is configured with mixer settings. The mixing settings may include a gain setting per intermediate masking signal.

In some embodiments the processor is configured with:

a gain stage, configured with a trigger for attack amplitude modulation of an intermediate masking signal and a trigger for decay amplitude modulation of the intermediate masking signal;

wherein the gain stage is triggered to perform attack amplitude modulation of the intermediate masking track in response to detecting a transition from voice in-activity to voice activity and to perform decay amplitude modulation of the intermediate masking track in response to detecting a transition from voice activity to voice in-activity.

Thereby artefacts in the masking signal due to processing thereof may be kept at an inaudible level or be reduced. In some aspects multiple intermediate masking signals are generated concurrently by multiple gain stages or in sequence. The intermediate masking signals may be mixed as described above.

In some embodiments the processor is configured with:

an active noise cancellation unit to process the microphone signal and supply an active noise cancellation signal to the loudspeaker; and a mixer to mix the active noise cancellation signal and the masking signal into a signal for the loudspeaker.

In particular active noise cancellation (ANC) is effective at cancelling noise with tones, such as noise from machines. This however makes voice activity more intelligible and more disturbing to a wearer of the wearable device. However, in combination with masking, which is applied at times when voice activity is detected, the sound environment perceived by a wearer is improved beyond active noise cancellation as such and beyond masking as such.

In some aspects active noise cancellation is implemented by a feed-forward configuration, a feedback configuration or by a hybrid configuration. In the feed-forward configuration, the wearable device is configured with an outside microphone, as explained above. The outside microphone forms a reference noise signal for an ANC algorithm. In the feedback configuration, an inside microphone is placed, as described above, for forming the reference noise signal for an ANC algorithm. The hybrid configuration combines the feed-forward and the feedback configuration and requires at least two microphones arranged as in feed-forward and the feedback configuration, respectively.

The microphone for generating the microphone signal for generating the masking signal may be an inside microphone or an outside microphone.

In some embodiments the processor is configured to selectively operate in a first mode or a second mode;

wherein, in the first mode, the processor controls the volume of the masking signal supplied to the loudspeaker; and wherein, in the second mode, the processor:

forgoes supplying the masking signal to the loudspeaker at the first volume irrespective of the voice activity signal being indicative of voice activity.

In this way it is enabled that the masking signal is not disturbing the wearer at times, in the second mode, when the wearer is speaking e.g. to a voice recorder coupled to receive the microphone signal, to a digital assistant coupled to receive the microphone signal, to a far-end party coupled to receive the microphone signal or to a person in proximity of wearer while the wearing the wearable device.

In some aspects, in the first mode, the wearable device acts as a headphone or an earphone. The first mode may be a concentration mode, wherein active noise reduction is applied and/or speech intelligibility is actively reduced by a masking signal. In the second mode, the wearable device is enabled to act as a headset. When enabled to act as a headset, the wearable device may be engaged in a call with a far-end party to the call.

The second mode may be selected by activation of an input mechanism such as a button on the wearable device. The first mode may be selected by activation or re-activation of an input mechanism such as the button on the wearable device.

In some aspects, the processor forgoes supplying the masking signal to the loudspeaker in the second mode or supplies the masking signal to the loudspeaker at a low volume, not disturbing the wearer. In some aspects, in the second mode, the processor forgoes enabling or disables that the masking signal is supplied to the loudspeaker.

Thus, the wearable device may be configured with a speech pass-through mode which is selectively enabled by a user of the wearable device.

In some embodiments the electro-acoustic input transducer is a first microphone outputting a first microphone signal; and wherein the wearable device comprises:

a second microphone outputting a second microphone signal; and a beam-former coupled to receive the first microphone signal or a third microphone signal from a third microphone and the second microphone signal and to generate a beam-formed signal.

In some aspects the beam-formed signal is supplied to a transmitter engaged to transmit a signal based on the beam-formed signal to a remote receiver while in the second mode defined above.

The beam-former may be an adaptive beam-former or a fixed beam-former. The beam-former may be a broadside beam-former or an end-fire beam-former.

There is also provided a signal processing method at a wearable electronic device comprising: an electro-acoustic input transducer arranged to pick up an acoustic signal and convert the acoustic signal to a microphone signal; a loudspeaker; and a processor performing:

controlling the volume of a masking signal; and supplying the masking signal to the loudspeaker;

detecting voice activity, based on processing at least the microphone signal, and generating a voice activity signal which is, concurrently with the microphone signal, sequentially indicative of one or more of: voice activity and voice inactivity; and controlling the volume of the masking signal in response to the voice activity signal in accordance with supplying the masking signal to the loudspeaker at a first volume at times when the voice activity signal is indicative of voice activity and at a second volume at times when the voice activity signal is indicative of voice in-activity.

Aspects of the method are defined in the summary section and in the dependent claims in connection with the wearable device.

There is also provided a signal processing module for a headphone or earphone configured to perform the method.

The signal processing module may be a signal processor e.g. in the form of an integrated circuit or multiple integrated circuits arranged on one or more circuit boards or a portion thereof.

There is also provided a computer-readable medium comprising instructions for performing the method when run by a processor at a wearable electronic device comprising: an electro-acoustic input transducer arranged to pick up an acoustic signal and convert the acoustic signal to a microphone signal; and a loudspeaker.

The computer-readable medium may be a memory or a portion thereof of a signal processing module.

BRIEF DESCRIPTION OF THE FIGURES

A more detailed description follows below with reference to the drawing, in which.

DETAILED DESCRIPTION

Figure 1:
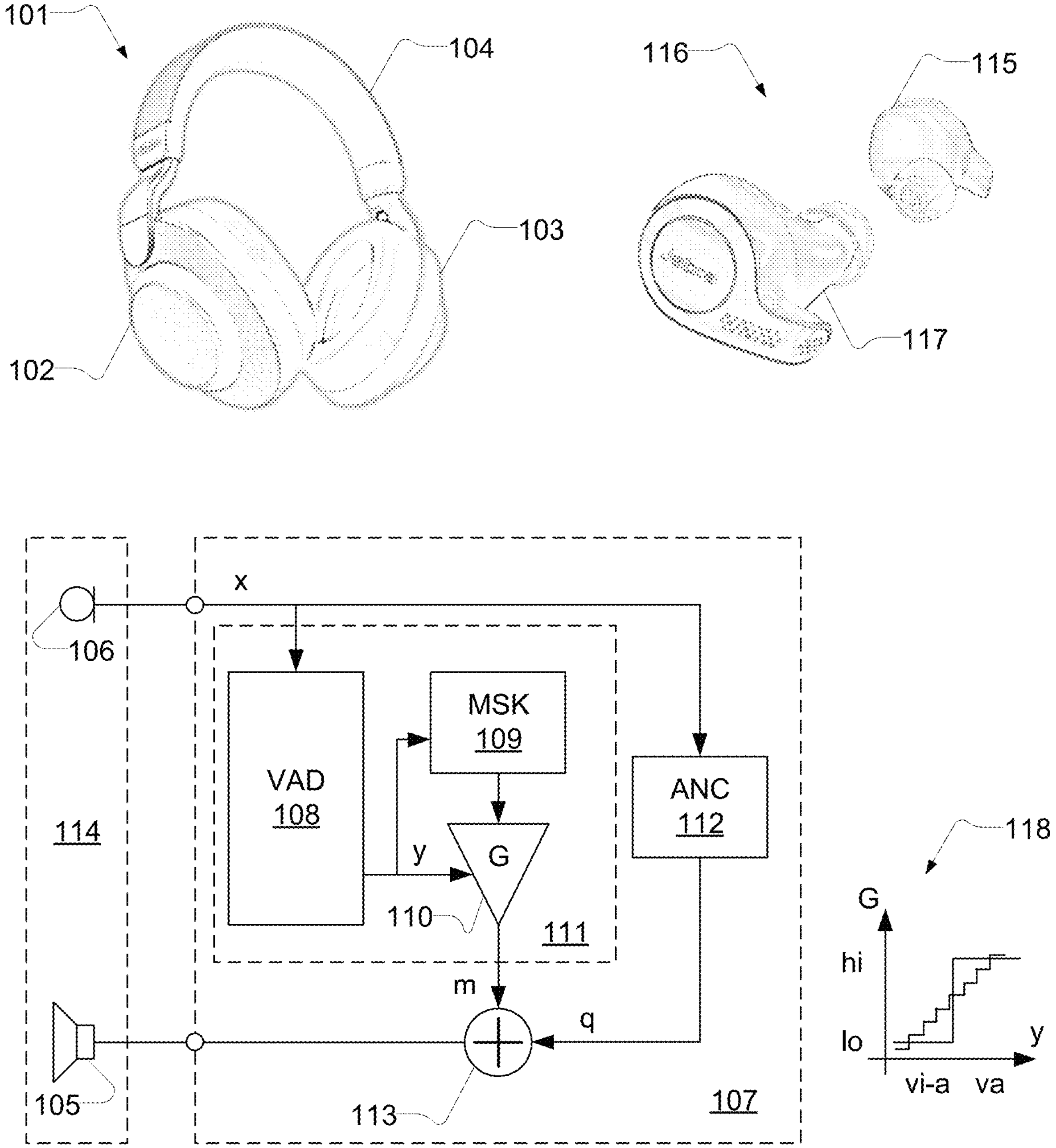
FIG. 1 shows a wearable electronic device embodied as a headphone and a pair of earphones and a block diagram of the wearable device.

FIG. 1 shows a wearable electronic device embodied as a headphone or as a pair of earphones and a block diagram of the wearable device.

The headphone 101 comprises a headband 104 carrying a left earpiece 102 and a right earpiece 103 which may also be designated earcups. The pair of earphones 116 comprises a left earpiece 115 and a right earpiece 117.

The earpieces comprise at least one loudspeaker 105 e.g. a loudspeaker in each earpiece. The headphone 101 also comprises at least one microphone 106 in an earpiece. As described herein, further below, the headphone or pair of earphones may include a processor configured with a selectable headset mode in which masking is disabled or significantly reduced.

The block diagram of the wearable device shows an electro-acoustic input transducer in the form of a microphone 106 arranged to pick up an acoustic signal and convert the acoustic signal to a microphone signal x, a loudspeaker 105, and a processor 107. The microphone signal may be a digital signal or converted into a digital signal by the processor. The loudspeaker 105 and the microphone 105 are commonly designated electro-acoustic transducer elements 114. The electro-acoustic transducer elements 114 of the wearable electronic device may comprise at least one loudspeaker in a left hand side earpiece and at least one loudspeaker in a right hand side earpiece. The electro-acoustic transducer elements 114 may also comprise one or more microphones arranged in one or both of the left hand side earpiece and the right hand side earpiece. Microphones may be arranged differently in the right hand side earpiece than in the left hand side earpiece.

The processor 107 comprises a voice activity detector VAD, 108 outputting a voice activity signal, y, which may be a time-domain voice activity signal or a frequency-time domain voice activity signal. The voice activity signal, y, is received by a gain stage G, 110 which sets gain factor in response to the voice activity signal. The gain stage may have two or more, e.g. multiple, gain factors selectively set in response to the voice activity signal. The gain stage G, 110 may also be controlled in response to the microphone signal e.g. via a filter or a circuit enabling adaptive gain control of the masking signal in accordance with a feed-forward or feedback configuration. The masking signal, m, may be generated by masking signal generator 109. The masking signal generator 109 may also be controlled by the voice activity signal, y. The masking signal, m, may be supplied to the loudspeaker 105 via a mixer 113. The mixer 113 mixes the masking signal, m, and a noise reduction signal, q. The noise reduction signal is provided by a noise reduction unit ANC, 112. The noise reduction unit ANC, 112 may receive the microphone signal, x, from the microphone 106 and/or receive another microphone signal from another microphone arranged at a different position in the headphone or earphone than the microphone 106. The masking signal generator 109, the voice activity detector 108 and the gain stage 110 may be comprised by a signal processing module 111.

Thus, the processor 107 is configured to detect voice activity in the microphone signal and generate a voice activity signal, y, which is sequentially indicative of at least one or more of: voice activity and voice in-activity. Further, the processor 107 is configured to control the volume of the masking signal, m, in response to the voice activity signal, y, in accordance with supplying the masking signal, m, to the loudspeaker 105 at a first volume at times when the voice activity signal, y, is indicative of voice activity and at a second volume at times when the voice activity signal, y, is indicative of voice in-activity. The first volume may be controlled in response to the energy level or envelope of the microphone signal or the energy level or envelope of the voice activity signal. The second volume may be enabled by not supplying the masking signal to the loudspeaker or by controlling the volume to be about 10 dB below the microphone signal or lower.

There is also shown a chart 118 illustrating that the gain factor of the gain stage G, 110 is relatively high when the voice activity signal is indicative of voice activity (va) and relatively low when the voice activity signal is indicative of voice in-activity (vi-a). The gain factor may be controlled in two or more steps.

Figure 2:
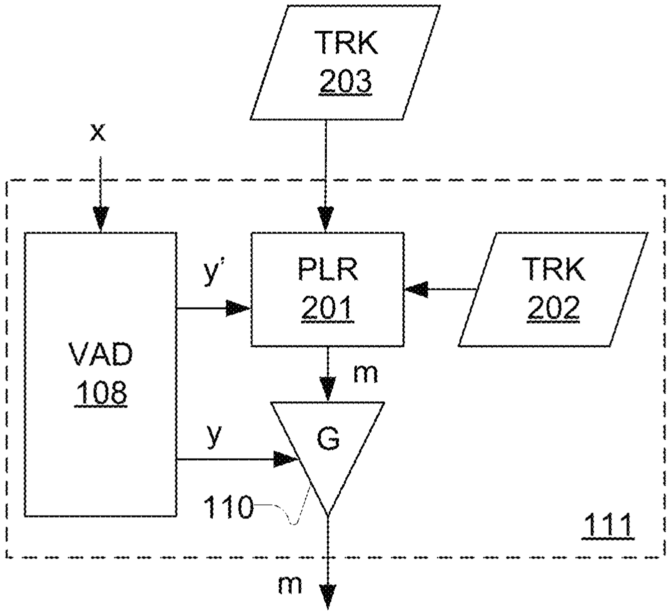
FIG. 2 shows a module, for generating a masking signal, comprising an audio player.

FIG. 2 shows a module, for generating a masking signal, comprising an audio player. The module 111 comprises the voice activity detector 108 and an audio player 201 and the gain stage G, 110. The audio player 201 is configured to play an embedded audio track 202 or an external audio track 203. The audio tracks 202 or 203 may comprise encoded audio samples and the player may be configured with a decoder for generating an audio signal from the encoded audio samples. An advantage of the embedded audio track 202 is that the wearable device may be configured with the audio track one time or in response to predefined events. The embedded audio track may then be played without requiring a wired or wireless connection to remote servers or other electronic devices; this in turn, may save battery power for battery operated wearable devices. An advantage of an external audio track 203 is that the content of the track may be changed in accordance with preferences or predefined events. The voice activity detector 108 may send a signal y' to the player 201. The signal y' may communicate a play command upon detection of voice activity and communicate a 'stop' or 'pause' command upon detection of voice inactivity.

Figure 3:
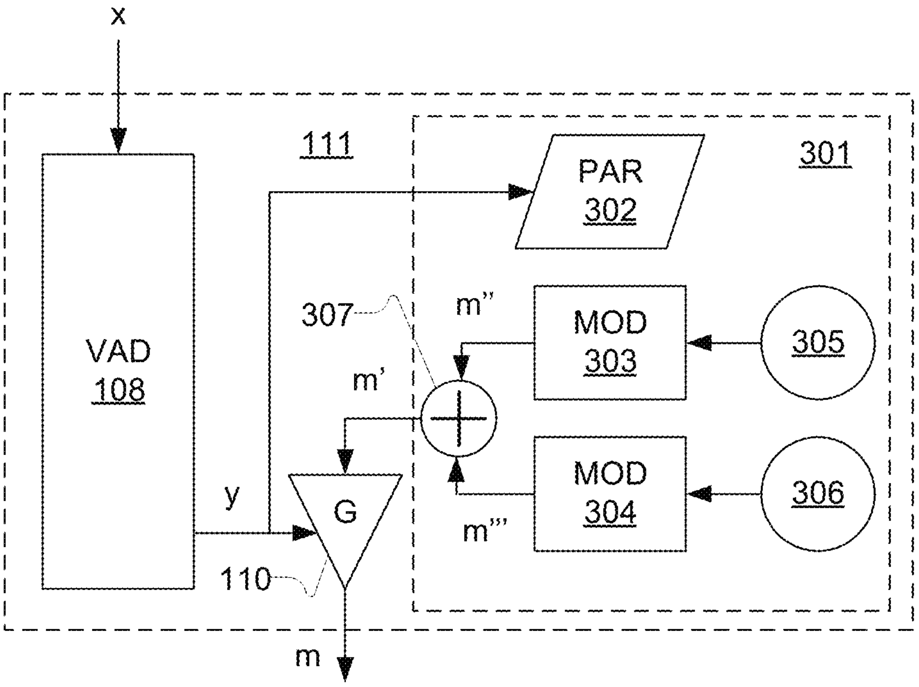
FIG. 3 shows a module, for generating a masking signal, comprising an audio synthesizer.

FIG. 3 shows a module, for generating a masking signal, comprising an audio synthesizer. The module 111 comprises the voice activity detector 108, an audio synthesizer 301 and the gain stage G, 110. The synthesizer 301 may generate the masking signal in accordance with parameters 302. The parameters 302 may be defined by hardware or software and may in some embodiments be selected in accordance with the voice activity signal, y. The synthesizer 301 comprises one or more tone or tones generators 305, 306 coupled to respective modulators 303, 304 which may modulate the dynamics of the signals from the tone or tones generators 305, 306. The modulators 303, 304 may operate in accordance with the parameters 302. The modulators 303, 304 output intermediate masking signals, m" and m'", which are input to a mixer 307, which mixes the intermediate masking signals to provide the masking signal, m', to the gain stage 110. Modulation of the dynamics of the signals from the tone or tones generators 305, 306 may change the envelope of the signals from the tone or tone generators.

Albeit volume control is described with respect to the gain stage G, 110, it should be noted that volume control may be achieved in other ways e.g. by controlling modulation or generation of the content of the masking signal itself.

Figure 4:
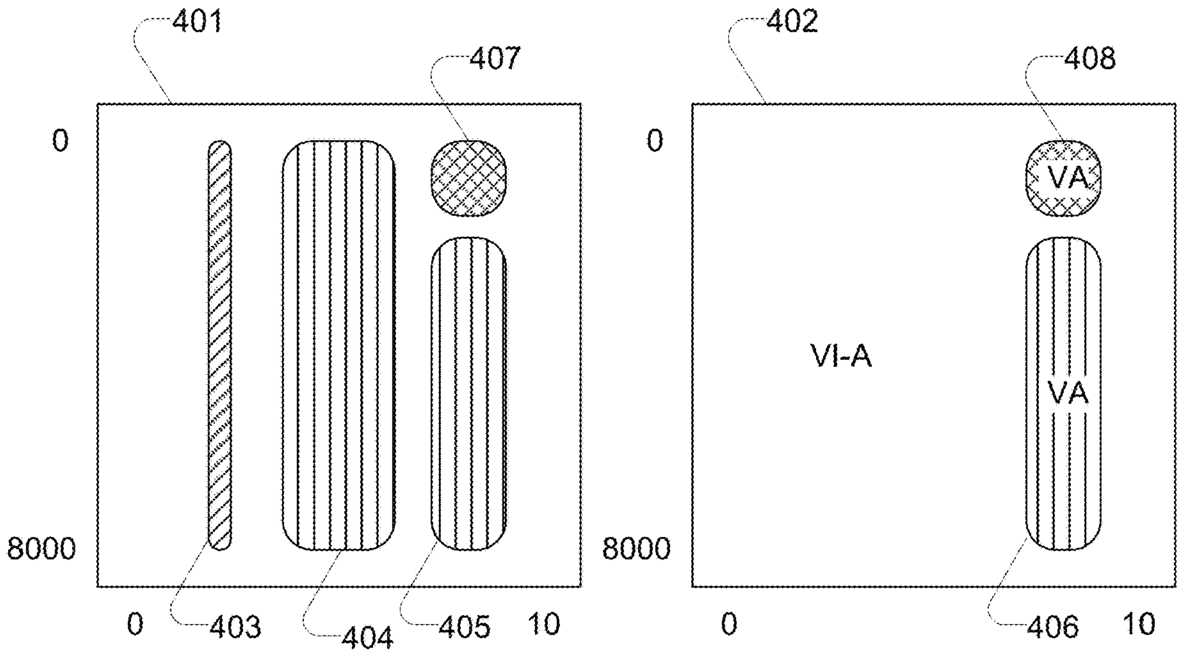
FIG. 4 shows a spectrogram of a microphone signal and a spectrogram of a corresponding voice activity signal.

FIG. 4 shows a spectrogram of a microphone signal and a spectrogram of a corresponding voice activity signal. Generally, a spectrogram is a visual representation of the spectrum of frequencies of a signal as it varies with time. The spectrograms are shown along a time axis (horizontal) and a frequency axis (vertical). The spectrograms, shown as illustrative examples, spans a frequency range of about 0 to 8000 Hz and a time period of about 0 to 10 seconds.

The spectrogram 401 (left hand side panel) of the microphone signal comprises a first area 403 in which signal energy is distributed across a broad range of frequencies and occurs at about 2-3 seconds. This signal energy is in a range up to 0 dB and originates mainly from keypresses on a keyboard.

A second area 404 contains signal energy, in a range below about −20 dB distributed across a broad range of frequencies and occurring at about 4-6 seconds. This signal energy originates mainly from indistinguishable noise sources, sometimes denoted background noise.

A third area represents presence of speech in the microphone signal and comprises a first portion 407, which represents the most dominant portion of the speech at lower frequencies, whereas a second portion 405 represents less dominant portions of the speech across a broader range of frequencies at higher frequencies. The speech occurs at about 7-8 seconds.

Output of a voice activity detector (e.g. voice activity detector 108) is shown in the spectrogram 402 (right hand side panel). It can be seen that the output of the voice activity detector is also located at times about 7-8 seconds. The level of the output of the voice activity detector corresponds to the energy level of the speech signal with a more dominant portion 408 at lower frequencies and a less dominant portion 406 across a broader range of frequencies at higher frequencies.

Output of a voice activity detector is thus shown as a spectrogram in accordance with a corresponding frame representation. The output of the voice activity detector is used to control the volume of the masking signal and optionally to generate the content of the masking signal is accordance with a desired spectral distribution. The output of a voice activity detector may be reduced to a one-dimensional binary or multilevel signal time-domain signal without a spectral decomposition.

Figure 5:
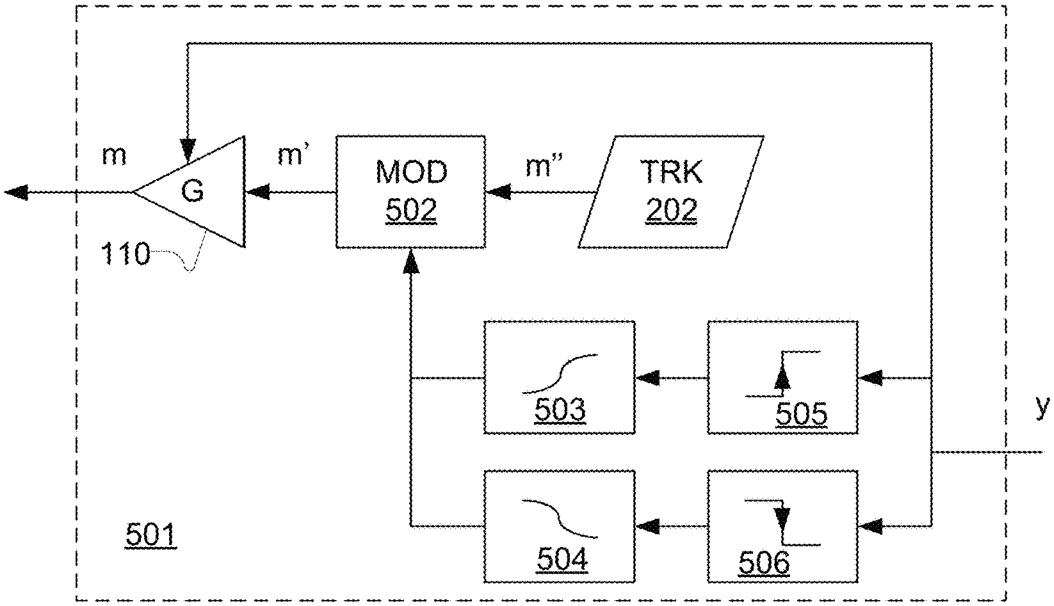
FIG. 5 shows a gain stage, configured with a trigger for amplitude modulation of a masking signal.

FIG. 5 shows a gain stage 501, configured with a trigger for amplitude modulation of a masking signal. This embodiment is an example of how to enable adapting the masking signal to obtain a desired fade-in and/or fade-out of the masking signal, m, based on the voice activity signal, y.

A first trigger unit 505 detects commencement of voice activity, e.g. by a threshold, and activates a fade-in modulation characteristic 503. The modulator 502 applies the fade-in modulation characteristic 503 for modulation of the intermediate masking signal m" to generate another intermediate masking signal, m', which is supplied to the gain stage G, 110.

A second trigger unit 506 detects termination or abatement of a period of voice activity, e.g. by a threshold, and activates a fade-out modulation characteristic 504. The modulator 502 applies the fade-out modulation characteristic 504 for modulation of the intermediate masking signal m" to generate another intermediate masking signal, m', which is supplied to the gain stage G, 110.

Thereby, artefacts in the masking signal may be reduced.

Figure 6:
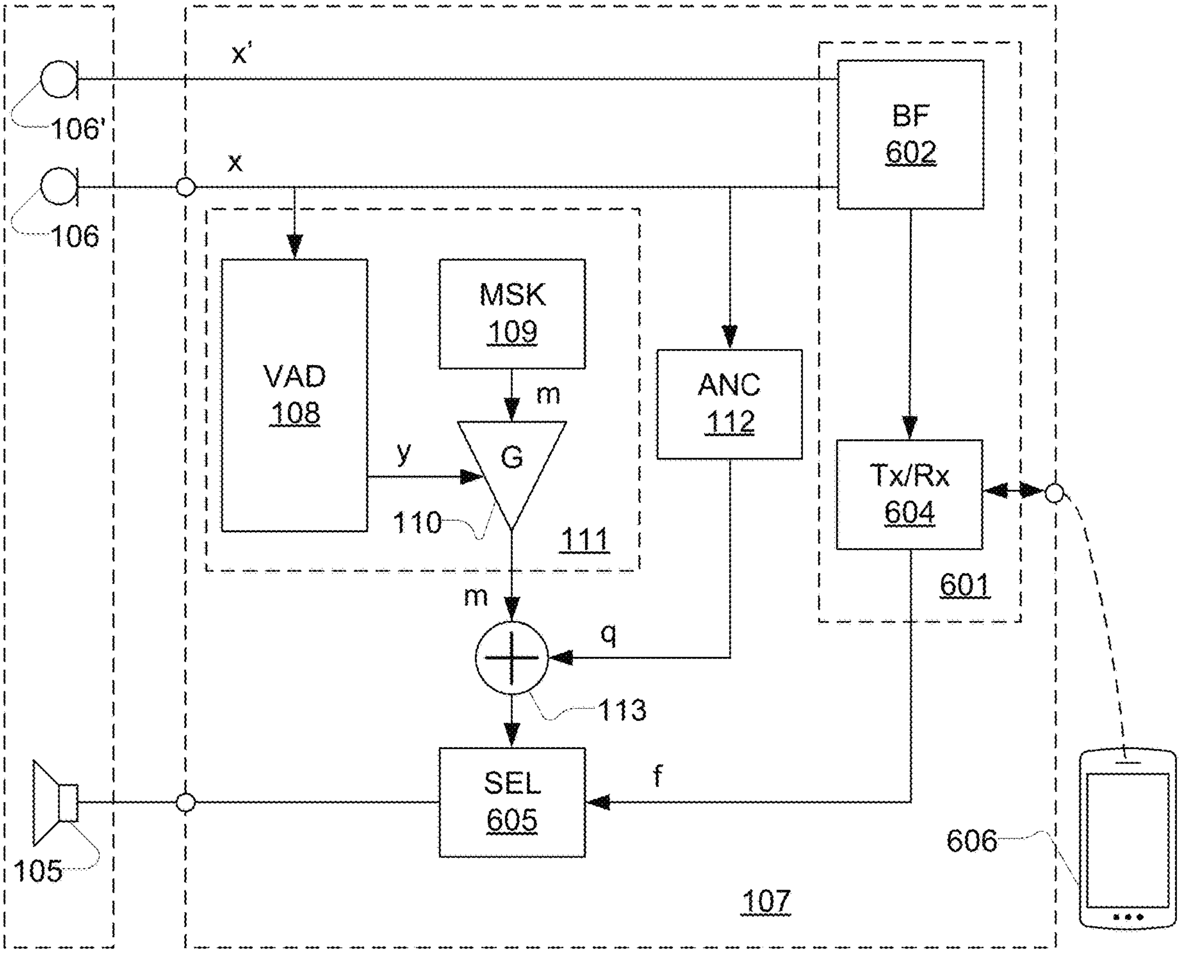
FIG. 6 shows a block diagram of a wearable device with a headphone mode and a headset mode.

FIG. 6 shows a block diagram of a wearable device with a headphone mode and a headset mode. The block diagram corresponds in some aspects to the block diagram described above, but further includes elements comprised by headset block 601 related to enabling a headset mode. Further, there is provided a selector 605 for selectively enabling the headset mode or the headphone mode. The selector 605 may enable that either the masking signal, m, or a headset signal, f, is supplied to the loudspeaker 105. The selector may engage or disengage other elements of the processor. The headset block 601 may comprise a beamformer 602 which receives the microphone signal, x, from the microphone 106 and another microphone signal, x', from another microphone 106'. The beamformer may be a broadside beamformer or an endfire beamformer or an adaptive beamformer. A beamformed signal is output from the beamformer and provided to a transceiver 604 providing wired or wireless communication with an electronic communications device 606 such as a mobile telephone or a computer.

Generally, it should be noted that the headphone or earphone may include elements for playing back music as it is known in the art. In connection therewith, playing back music for the purpose of listening to the music, may be implemented by selection of a mode, which disables the voice activity controlled masking described above.

Generally, it should be appreciated that the person skilled in the art may perform experiments, surveys and measurements to obtain appropriate volume levels for the masking signal. Also, experiments, surveys and measurements may be needed to avoid introducing audible or disturbing artefacts from (non-linear) signal processing associated with the masking signal.

The invention claimed is:

1. A wearable electronic device comprising:
- an electro-acoustic input transducer configured to:
  - pick up an acoustic signal, and
  - convert the acoustic signal to a microphone signals (x);
- a loudspeaker; and
- a processor comprising:
  - a voice activity detector configured to detect voice activity based on processing time-domain waveforms of the microphone signals (x) by:
    - generating frames comprising frequency-time representations of the waveforms of the microphone signal (x), and
    - detecting the voice activity only when voice activity is determined to be in a predefined number of consecutive frames;
  - a machine learning component configured to:
    - generate a voice activity signal (y), concurrently with the microphone signal (x), by indicating periods of time in which the microphone signal (x) includes signal components that represent detected voice activity and signal components that represent detected voice inactivity; and
    - wherein the generated voice activity signal (y) is sequentially indicative of at least one voice activity and voice inactivity;
  - control a volume of a masking signal (m) in response to the generated voice activity signal (y) to be at a first volume when the generated voice activity signal (y) is indicative of voice activity and to be at a second volume when the generated voice activity signal (y) is indicative of voice inactivity; and
  - supply the masking signal (m) to the loudspeaker.

2. A wearable device according to claim 1, wherein the processor is configured with at least one of:
- an audio player to generate the masking signal by playing an audio track; and
- an audio synthesizer to generate the masking signal using one or more signal generators.

3. A wearable device according to claim 1, wherein the generated frames comprise values arranged in frequency bins.

4. A wearable device according to claim 1, wherein the processor controls the masking signal (m) in accordance with a time and frequency distribution of the envelope of the masking signal substantially matching the voice activity signal or the envelope of the voice activity signal, which is in accordance with the frequency-time representation.

5. A wearable device according to claim 1, wherein the processor is further configured to:
- gradually increase the volume of the masking signal (m) over time in response to detecting an increasing frequency or density of voice activity.

6. A wearable device according to claim 1, wherein the processor further comprises:

a mixer to generate the masking signal (m) from one or more selected intermediate masking signals from multiple intermediate masking signals, and wherein selection of the one or more selected intermediate masking signals is performed in accordance with a criterion based on one or both of the microphone signal and the voice activity signal.

7. A wearable device according to claim 1, wherein the processor further comprises:

a gain stage, configured with a trigger for attack amplitude modulation of an intermediate masking signal and a trigger for decay amplitude modulation of the intermediate masking signal;

wherein the gain stage is triggered to perform attack amplitude modulation of the intermediate masking track in response to detecting a transition from voice in-activity to voice activity and to perform decay amplitude modulation of the intermediate masking track in response to detecting a transition from voice activity to voice in-activity.

8. A wearable device according to claim 1, wherein the processor further comprises:

an active noise cancellation unit to process the microphone signal (x) and supply an active noise cancellation signal (q) to the loudspeaker; and a mixer to mix the active noise cancellation signal (q) and the masking signal (m) into a signal for the loudspeaker.

9. A wearable device according to claim 1, wherein the processor is further configured to selectively operate in a first mode or a second mode;

wherein, in the first mode, the processor:

controls the volume of the masking signal (m) supplied to the loudspeaker; and wherein, in the second mode, the processor:

forgoes supplying the masking signal (m) to the loudspeaker at the first volume irrespective of the voice activity signal (y) being indicative of voice activity.

10. A wearable device according to claim 1, wherein the electro-acoustic input transducer is a first microphone outputting a first microphone signal (x); and wherein the wearable device comprises:

a second microphone outputting a second microphone signal (x'); and a beam-former coupled to receive the first microphone signal (x) or a third microphone signal from a third microphone and the second microphone signal (x') and to generate a beam-formed signal.

11. A signal processing method at a wearable electronic device comprising:

an electro-acoustic input transducer arranged to pick up an acoustic signal and convert the acoustic signal to a microphone signal (x); a loudspeaker; and a processor comprising a machine learning component that is configured to:

control a volume of a masking signal (m);

supply a masking signal (m) to the loudspeaker;

detect voice activity based on processing at least of time-domain waveforms of the microphone signal (x) that includes:

generating frames comprising frequency-time representations of the waveforms of the microphone signal (x), and determining the voice activity only when voice activity is determined to be in a predefined number of consecutive frames; and generate a voice activity signal (y) which is, concurrently with the microphone signal, sequentially indicative of one or more of voice activity and voice in-activity; and control the volume of the masking signal (m) in accordance with a sound pressure level of the acoustic signal when supplying the masking signal (m) to the loudspeaker at a first volume at times when the voice activity signal (y) is indicative of voice activity and at a second volume at times when the voice activity signal (y) is indicative of voice in-activity.

12. The wearable electronic device according to claim 1, wherein the machine learning component is a recurrent neural network.

13. The wearable electronic device according to claim 1, wherein the machine learning component is a convolutional neural network.

14. The signal processing method according to claim 11, wherein the machine learning component is a recurrent neural network.

15. The signal processing method according to claim 11, wherein the machine learning component is a convolutional neural network.

* * * * *